United States Patent
Studebaker et al.

(10) Patent No.: US 7,044,504 B2
(45) Date of Patent: May 16, 2006

(54) SUB-ASSEMBLY MOUNTING SYSTEM

(75) Inventors: Curt J. Studebaker, Columbia City, IN (US); John M. Ammer, New Haven, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 414 days.

(21) Appl. No.: 10/691,235

(22) Filed: Oct. 22, 2003

(65) Prior Publication Data

US 2005/0087971 A1  Apr. 28, 2005

(51) Int. Cl.
*B62D 21/00* (2006.01)

(52) U.S. Cl. .................. 280/783; 280/830; 280/831; 280/834

(58) Field of Classification Search ............... 280/830, 280/831, 832, 834, 837, 838, 839, 783, 789, 280/795
See application file for complete search history.

(56) References Cited

U.S. PATENT DOCUMENTS

| | | | | |
|---|---|---|---|---|
| 2,226,713 | A * | 12/1940 | Folmsbee | 105/362 |
| 3,766,862 | A * | 10/1973 | Heap et al. | 105/358 |
| 5,607,133 | A * | 3/1997 | Markham et al. | 248/313 |
| 5,634,665 | A * | 6/1997 | Jung | 280/834 |
| 6,047,989 | A * | 4/2000 | Wood | 280/789 |
| 6,053,533 | A | 4/2000 | Osborn et al. | |
| 6,402,199 | B1 * | 6/2002 | Wojnowski | 280/838 |
| 6,715,195 | B1 * | 4/2004 | Erickson | 29/434 |

* cited by examiner

*Primary Examiner*—Paul N. Dickson
*Assistant Examiner*—Toan C. To
(74) *Attorney, Agent, or Firm*—Jeffrey P. Calfa; Dennis Kelly Sullivan; Susan L. Lukasik

(57) ABSTRACT

A mounting arrangement for a modular component such as a fuel tank on a vehicle includes sub-assembly of the fuel tank on a carrier for installation on the chassis. Alignment is provided by alignment arms extending outwardly from the chassis cooperating with mounting tabs disposed downwardly from the module. The alignment arms are members of a pair of brackets which are attached to the frame rails. The module rests on the brackets when lowered onto the chassis. Frame and module are connected by fasteners between the brackets and the mounting tabs.

3 Claims, 8 Drawing Sheets

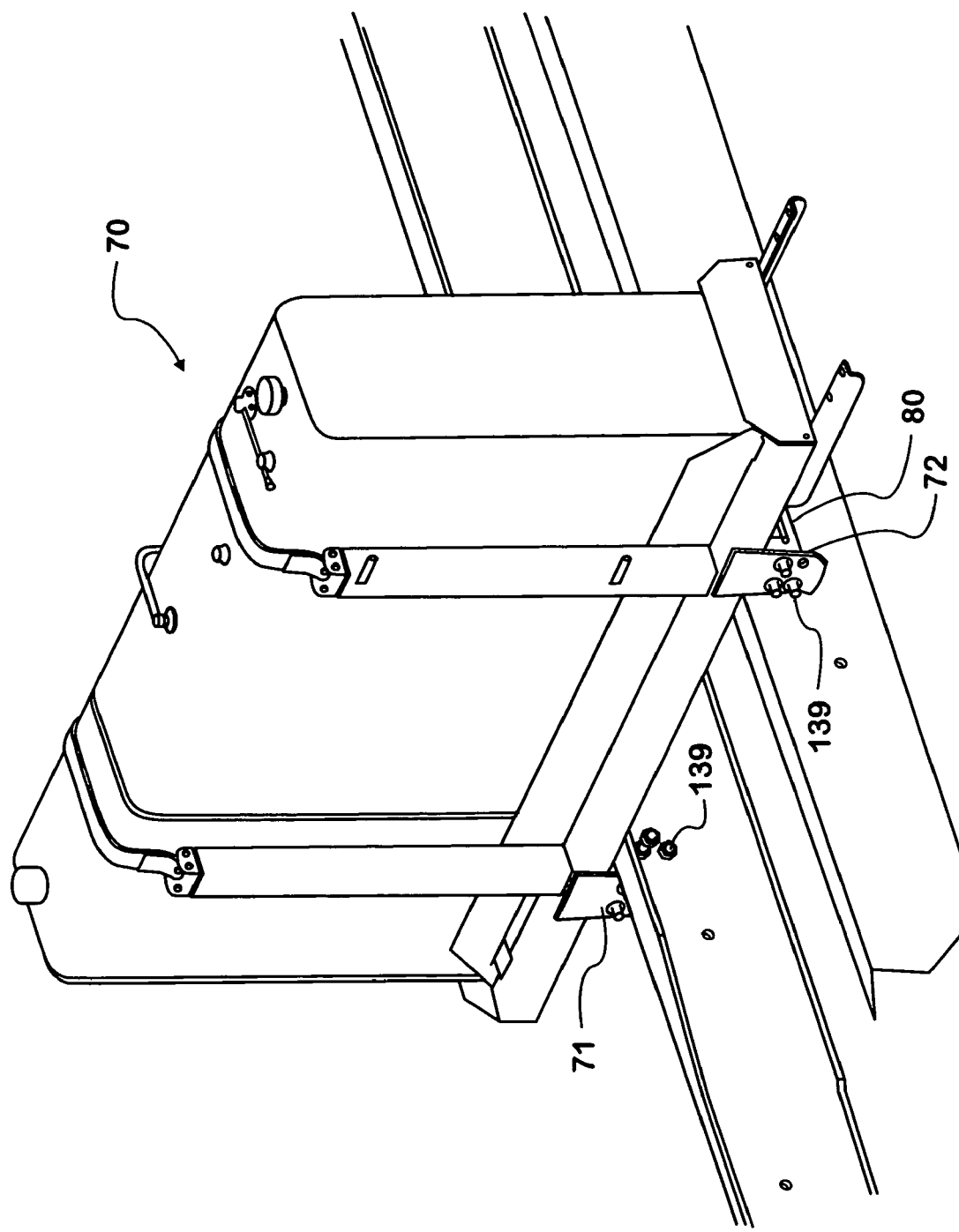

SUB-ASSEMBLY MOUNTING SYSTEM

BACKGROUND OF THE INVENTION

1. Technical Field

The present invention relates to a mounting arrangement for a sub-assembly on a vehicle and more particularly to a mounting arrangement and method for modular components and sub-assemblies such as fuel tank modules across a vehicle frame.

2. Description of the Problem

Trucks are built on frames which serve as foundations for the vehicle's body and as a platform on or to which various components may be mounted or attached. A typical full perimeter frame includes, among other components, two longitudinally extending frame rails. The rails are commonly connected to one another by several latitudinal cross members. The cross members provide lateral and torsional rigidity to the frame assembly. One cross member will typically be positioned to support a truck cab. Components, such as fuel and hydraulic tanks, may be mounted across the frame rails perpendicular to the direction of elongation of the vehicle.

Back of cab fuel tank modules are known which are supported across the frame rails as illustrated in FIG. 3. In this design, mounting brackets descend from the bottom of the tank module, which allows for attachment to mounting points on the frame rails. The mounting brackets provide good side-to-side alignment, but do not provide fore/aft positioning or good vertical positioning to allow the introduction of fasteners.

Assembly of vehicles would be eased if fuel tank modules were automatically aligned with the correct position on the vehicle chassis for attachment to the chassis as the fuel tank modules were positioned on the vehicle.

SUMMARY OF THE INVENTION

The present invention provides a vehicle chassis with a modular sub-assembly such as a tank for fuel or hydraulic fluid. The vehicle chassis has first and second longitudinally aligned frame rails. Each frame rail has an outwardly oriented side. First and second rail side brackets are mounted to the outwardly oriented sides of the first and second frame rails, respectively. Each rail side bracket has a pair of outward extending, parallel guide or alignment arms. The module is supported latitudinally across the frame rails from an elongated carrier forming the bottom of the module. The elongated carrier is supported from below on back edges of the first and second rail side brackets. Four mounting tabs descend from the elongated carrier, extending downwardly from the module. Each mounting tab has a one to one correspondence with a different, alignment arm. The four mounting tabs are spaced to straddle the frame rails to the outside and to bracket the alignment arms as the module is lowered onto the chassis. To effect this cooperation the mounting tabs have alignment edges along one side facing the outside face of the frame rail and leading cam sections along the bottom portion of the mounting tab. The alignment edges urge the module into the correct side-to-side position working against the frame rails and the cam sections urge the module into the correct fore/aft position working against the alignment arms. The module is vertically positioned by the support provided the module from the back edges of the rail side brackets. Fastening points are provided through the guide/alignment arms and mounting tabs.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 is a perspective view of the modular fuel tank sub-assembly attached to a vehicle chassis.

DETAILED DESCRIPTION OF THE INVENTION

Figure 1:
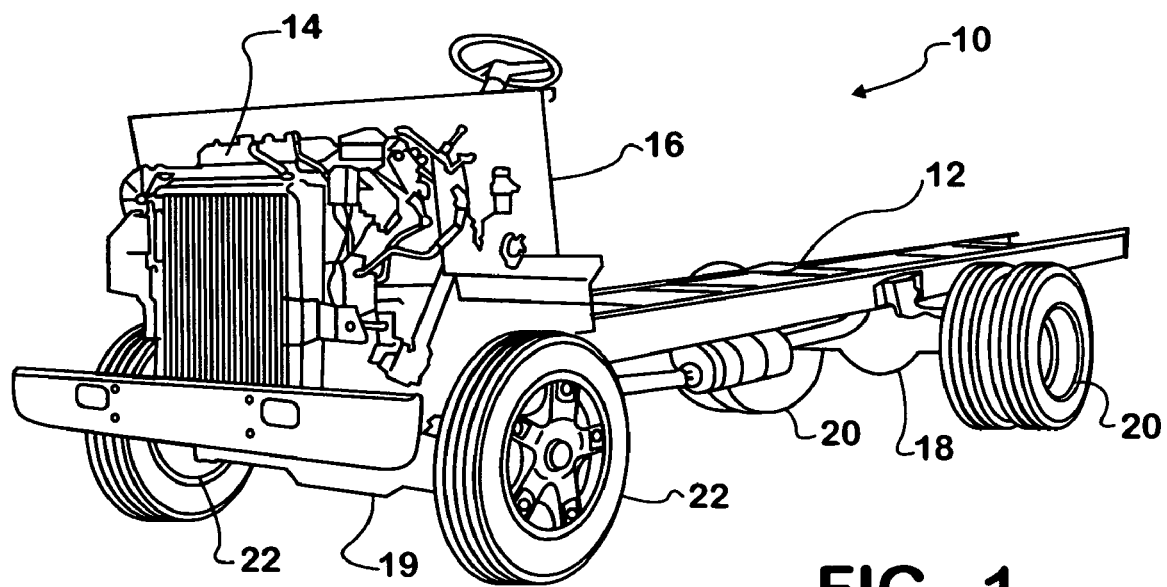
FIG. 1 is a perspective view of a vehicle chassis.

Referring now to the figures and in particular to FIG. 1, a perspective view of a vehicle chassis 10 is illustrated. The foundational component of chassis 10 is a box frame 12. Frame 12 provides connection points for suspension elements for numerous vehicle components, including by way of example, rear axle 18 and front axle 19. Rear wheels 20 and front wheels 22, are mounted on axles 18 and 19, respectively. Frame 12 carries an engine 14 and dash panel 16 and provides a base for the construction of a body (not shown) and a place to position the modular tank of the present invention.

Figure 2:
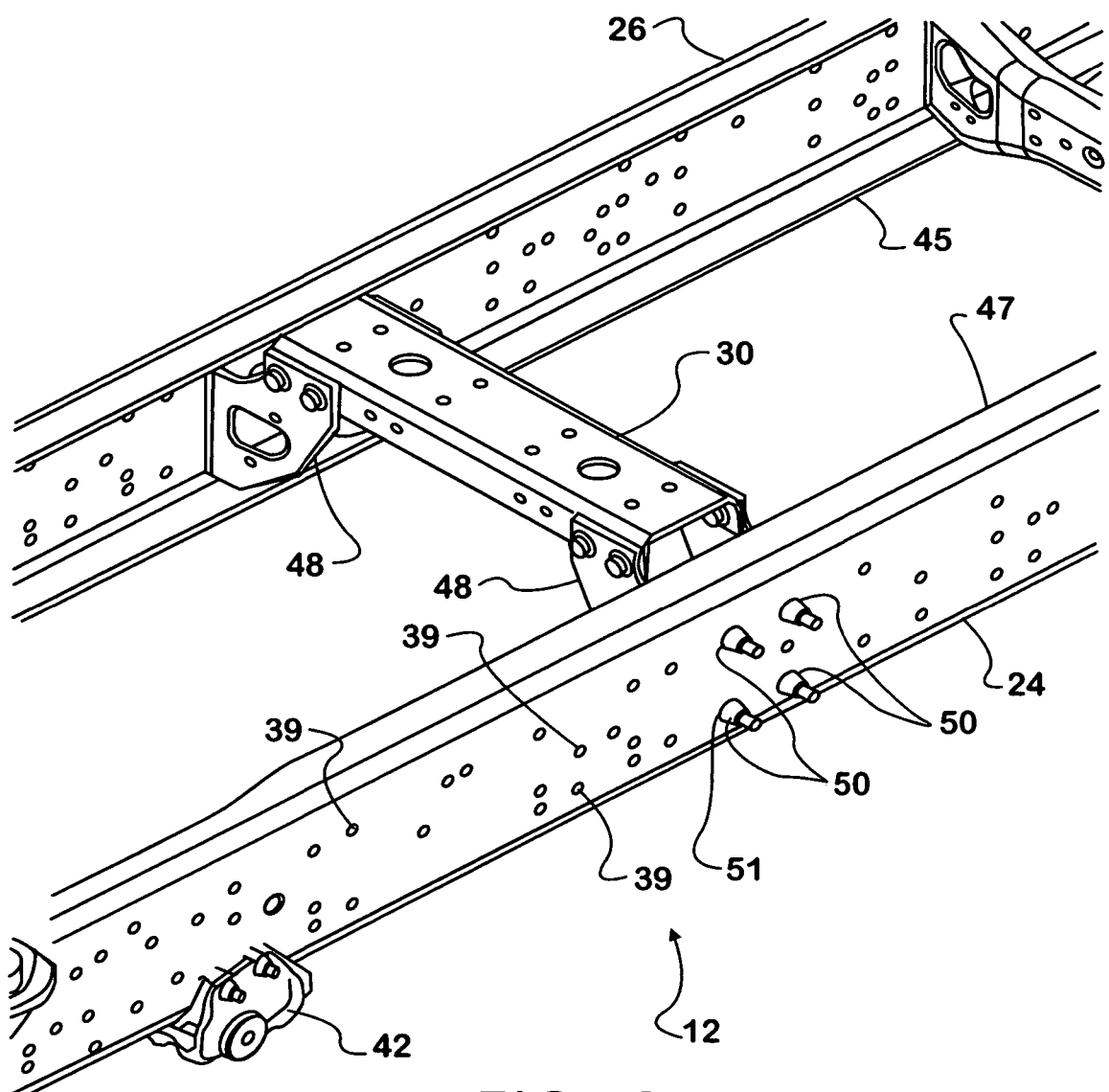
FIG. 2 is a partial view of a pair of frame rails from the vehicle chassis of FIG. 1.

FIG. 2 illustrates that box frame 12 is constructed in part from two elongated frame rails 24 and 26, each of which run substantially the length of a vehicle and which lie parallel to one another. Frame rails 24 and 26 are held parallel to one another by a series of cross members, here arranged perpendicularly to the frame rails, although other orientations for cross members are possible. Among the cross members is an intermediately positioned, cab support cross member 30. The cab support cross member 30 supports a driver and passenger cab positioned on frame 12.

Frame rails 24 and 26 have top and bottom flanges 47 and 45, respectively (visible on frame rail 26). Flanges 47 and 45 of both rails 24 and 26 extend inwardly toward the centerline of the frame 12, as illustrated by the flanges from frame rail 26. Flanges 45 and 47 give frame rails 24 and 26 their characteristic C cross sectional shape with flange 45 providing an upper surface. Numerous holes 39 pass through frame rails 24 and 26 to provide support points for the insertion mounting components such as bolts. Nut and bolt combinations 50 are illustrated in association with cross member 30, providing connection of mounting hardware for the cross member to frame rail 24.

Figure 3:
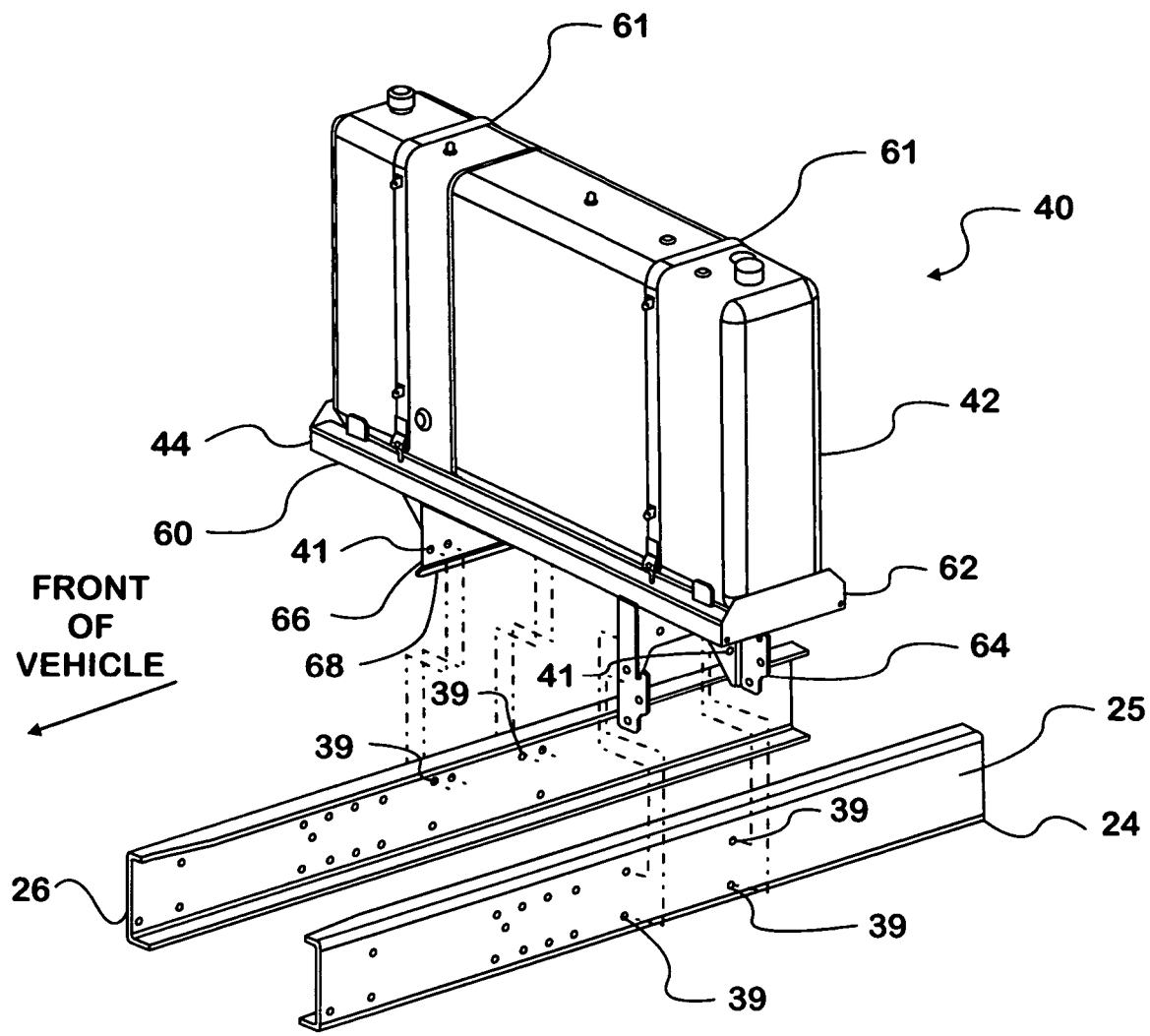
FIG. 3 is a partially exploded view of a prior art fuel tank module and chassis combination.

Referring to FIG. 3 a prior art method of installing a fuel tank module 40 on a pair of frame rails 24, 26 is illustrated. Fuel tank module 40 comprises a fuel tank 42 set in an elongated carrier 44 which may be constructed of support rails 60 and end plates 62 to form a rectangular cradle to receive the bottom portion of the fuel tank. Carrier 44 supports fuel tank 42 from underneath and provides a frame which may be rested across frame rails 24 and 26. The fuel tank is held in carrier 44 by straps 61 which are wrapped across the top of the tank from each side. Extending downwardly from carrier 44 are two mutually spaced mounting brackets 64 and 66. Mounting brackets 64, 66 are spaced to fit around the relative outside faces of frame rails 24 and 26. The outside faces (including outside face 25 for frame rail 24) are flat faces oriented facing away from the longitudinal centerline of chassis 10. Right side mounting bracket 66 includes a bottom edge 68 which is turned outwardly relative to frame rail 26 at the bottom of the bracket to allow some initial side to side play in fit as fuel tank module 40 is lowered onto a vehicle chassis. The minimum spacing between brackets 64 and 66 is however set to much closer tolerances to provide a snug fit for the brackets around frame rails 24 and 26. This provides good side to side positioning of the fuel tank module 40, however, it leaves it to the production workers on the line to adjust the front to back and vertical position of the fuel tank module to bring attachment points 41 on the mounting brackets into alignment with attachment points 39 in frame rails 24 and 26.

Figure 4:
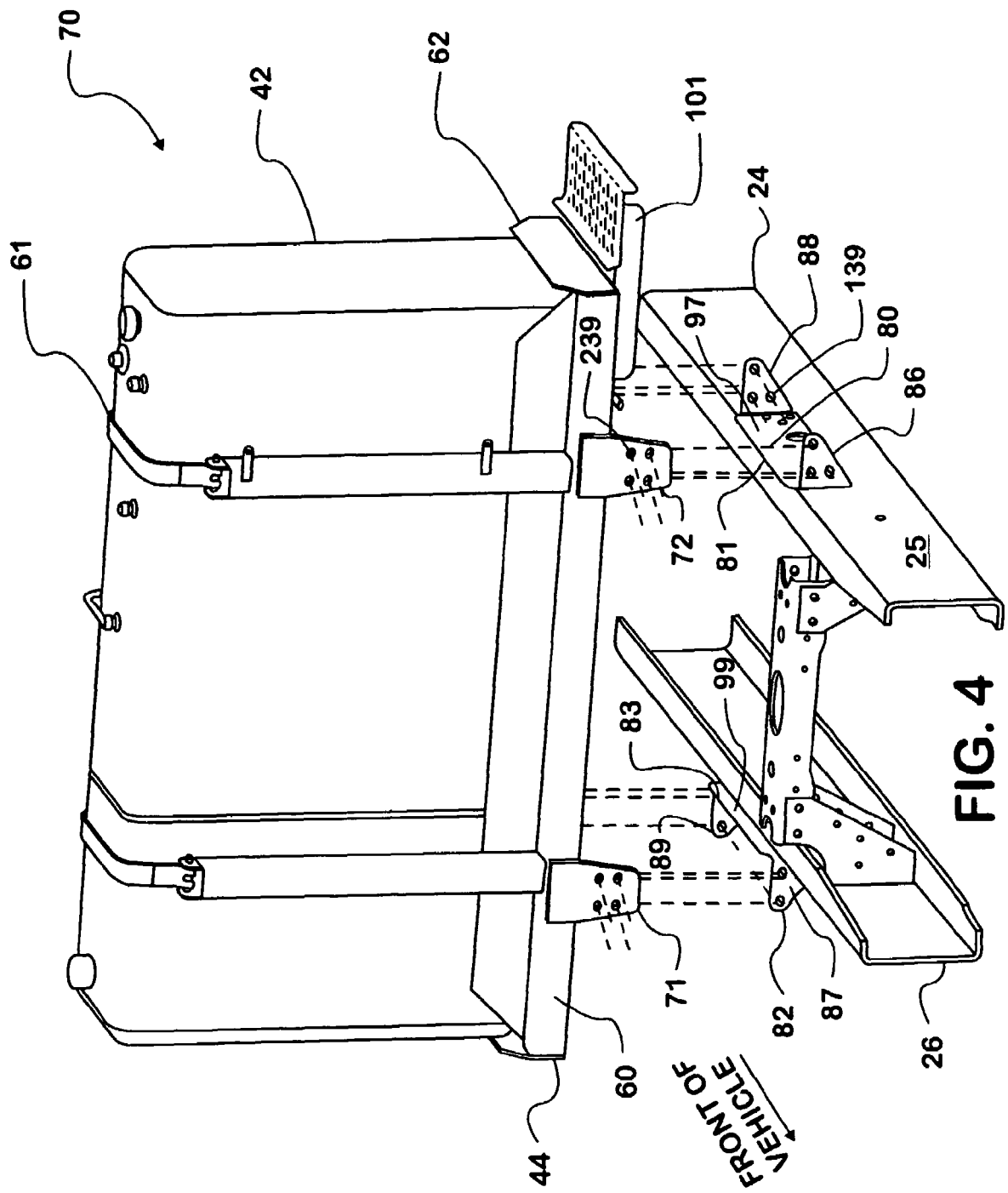
FIG. 4 is a partially exploded view of a modular fuel tank sub-assembly and chassis combination in accordance with one embodiment of the present invention.

Referring now to FIG. 4, a partially exploded view of a vehicle chassis and fuel tank assembly is illustrated with a sub-assembly, here a fuel tank module 70, shown above its mounting position across vehicle frame rails 24 and 26. In the present invention, as distinguished from the prior art described with reference to FIG. 3, the mounting hardware is divided between portions installed on frame rails 24 and 26 prior to mounting of the fuel tank module 70, namely side rail brackets 80 and 82, and those components descending from the fuel tank module, namely four mounting tabs 71, 72, 73 and 74 (with mounting tabs 73, 74 shown in FIG. 7). Side rail brackets 80 and 82 are C-channel shaped metal components, attached along back sections 97 and 99, respectively, to the outer faces of frame rails 24 and 26. Conventional fasteners, such as nuts and bolts, may be used to mount side rail brackets 80, 82 from the outer faces of frame rail 24 and 26, with the bolts positioned through mounting hole attachment points 39 in the frame rails and openings through the back sections 97, 99 of the side rail brackets. Side rail brackets 80 and 82 each include two outwardly oriented arms or guide arms, including guide arms 86 and 88 from side rail bracket 80 and guide arms 87 and 89 from side rail bracket 82. Attachment of fuel tank module 70 to frame rails 24, 26 is effected by attachment of the four mounting tabs 71–74 to the guide arms of the two side rail brackets 80, 82.

Rail side brackets 80, 82 cooperate with mounting tabs 71–74 to provide front to back positioning of fuel tank module 70. Rail side brackets 80, 82 further provide a support for elongated carrier 44 to position fuel tank module 70 vertically. Rail side brackets 80 and 82 are located on frame rails 24 and 26 to leave the topmost portions of back sections 97 and 99 extending above the upper faces of frame rails. This arrangement positions support edges 81 and 83 to support elongated carrier 44 from its bottom surface, or the bottom surface of its exterior rails 60. Guide arms 86–89 are truncated right triangular shaped projections, with one base providing juncture with the respective back sections of the rail side brackets 80, 82. Attachment points 139 are provided through each of the guide arms 86–89 and attachment points 239 are provided through mounting tabs 71–74. A step 101 is illustrated extending past one end 62 of elongated carrier 60.

Figure 5:
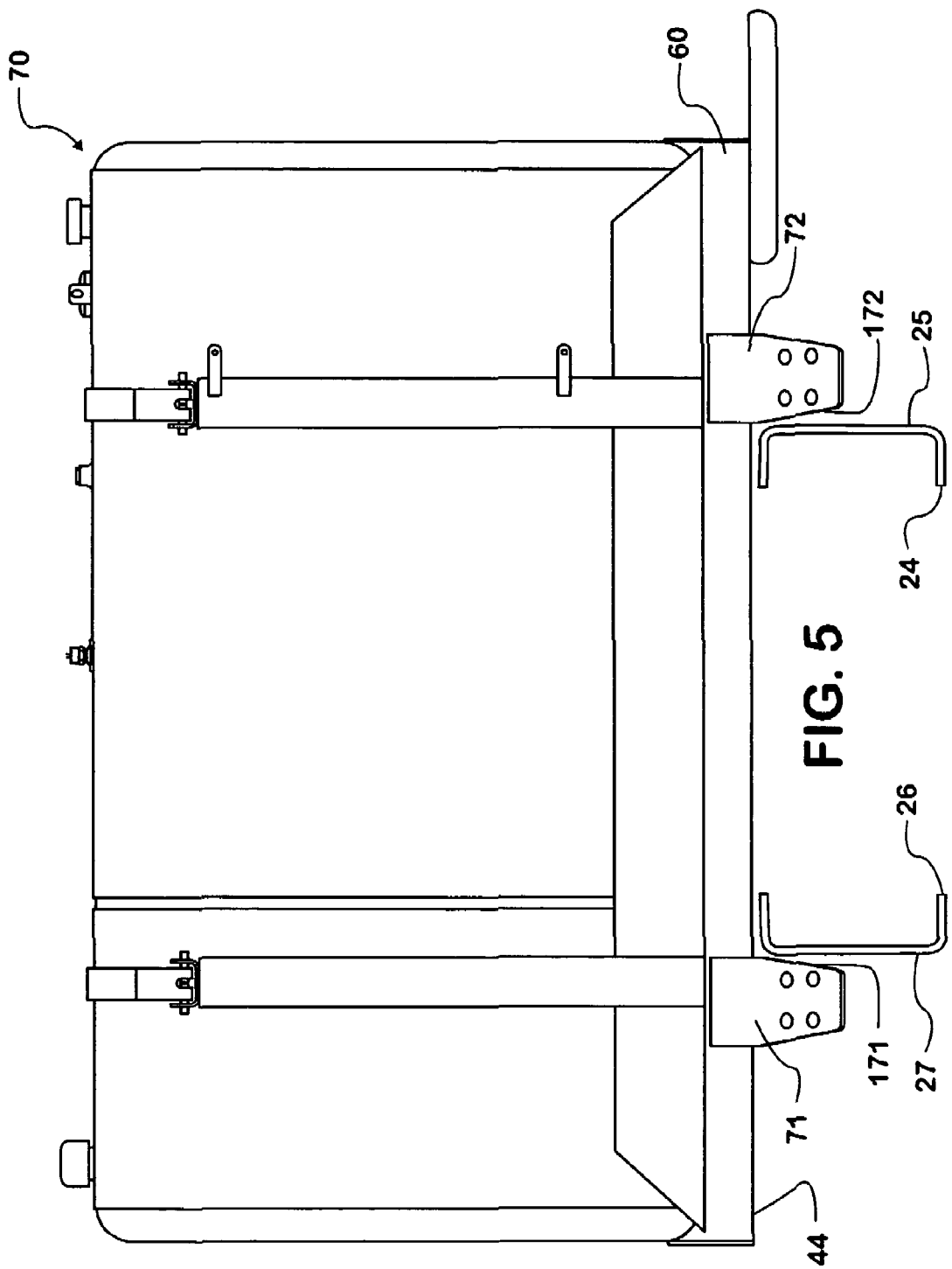
FIG. 5 is a front elevation of the modular fuel tank sub-assembly as positioned on the parallel frame rails of the chassis.

Mounting tabs 71–74 cooperate with frame rails 24, 26 to locate fuel tank module 70 from side to side over the frame rails. Referring to FIG. 5 mounting tabs 71 and 72 may be seen to descend from side rail 60 of elongated carrier 44, extending downwardly from the carrier (in its usual orientation) to the relative outside of chassis 10 as defined by frame rails 24 and 26. Mounting tabs 73 and 74, which do not appear in this figure operate in the same fashion and the discussion relating to tabs 71 and 72 is equally applicable to them. Side rail brackets 80, 82 are deleted from FIG. 5 to better illustrate the interaction of mounting tabs 71 and 72 with frame rails 24 and 26. The relative interior edges 171 and 172 of mounting tabs 71 and 72, respectively, are angled away from the outer faces 27 and 25 from top to bottom. Interior edges 171 and 172 function as cams against the upper edges of outer faces 27 and 25 to urge fuel tank assembly 70 toward a centered position over frame rails 26 and 24 as the fuel tank assembly is lowered onto the rails, even if the fuel tank assembly is initially somewhat misaligned relative to the chassis.

Figure 6:
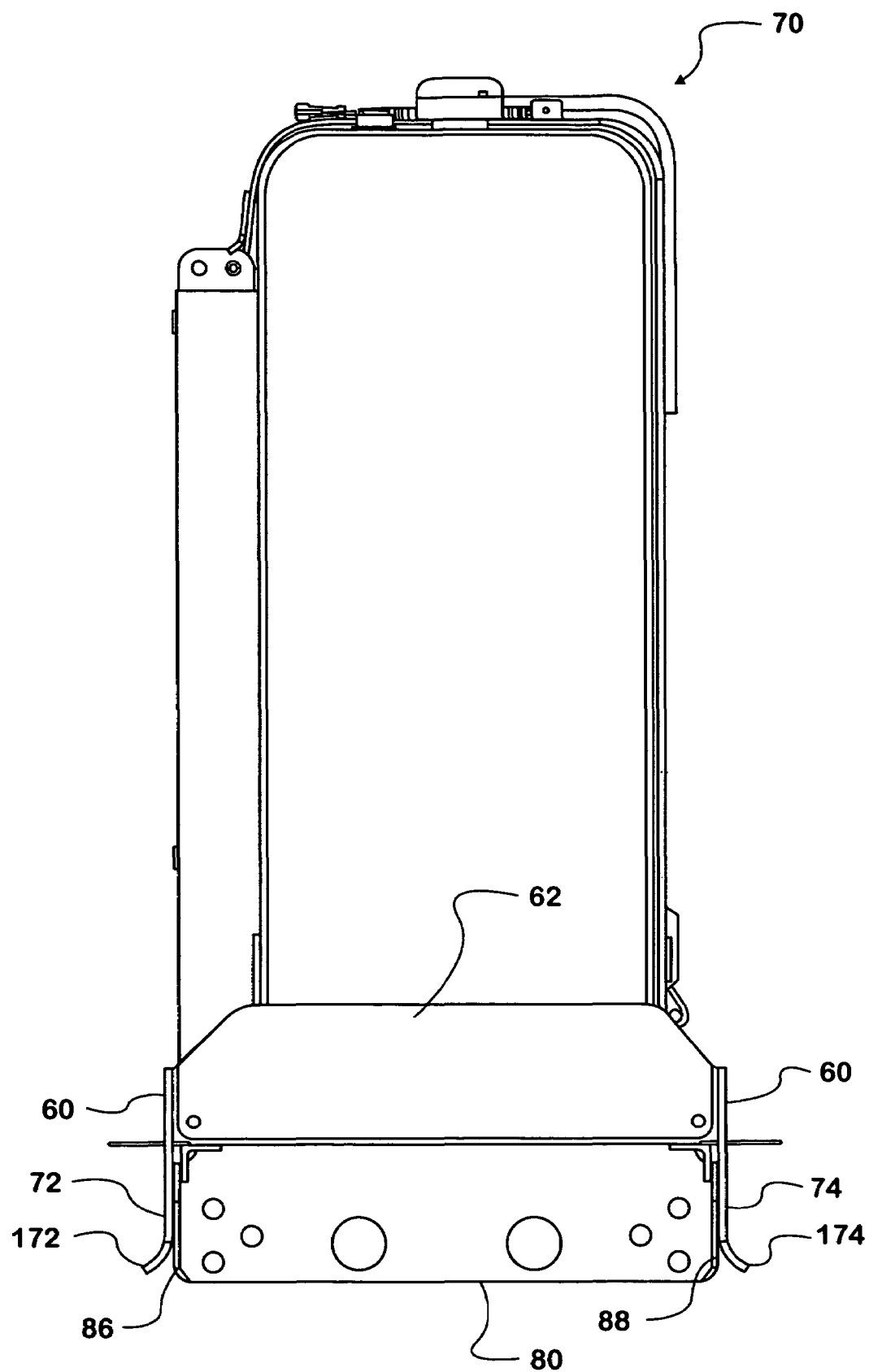
FIG. 6 is a side elevation of the modular fuel tank sub-assembly.
Figure 7:
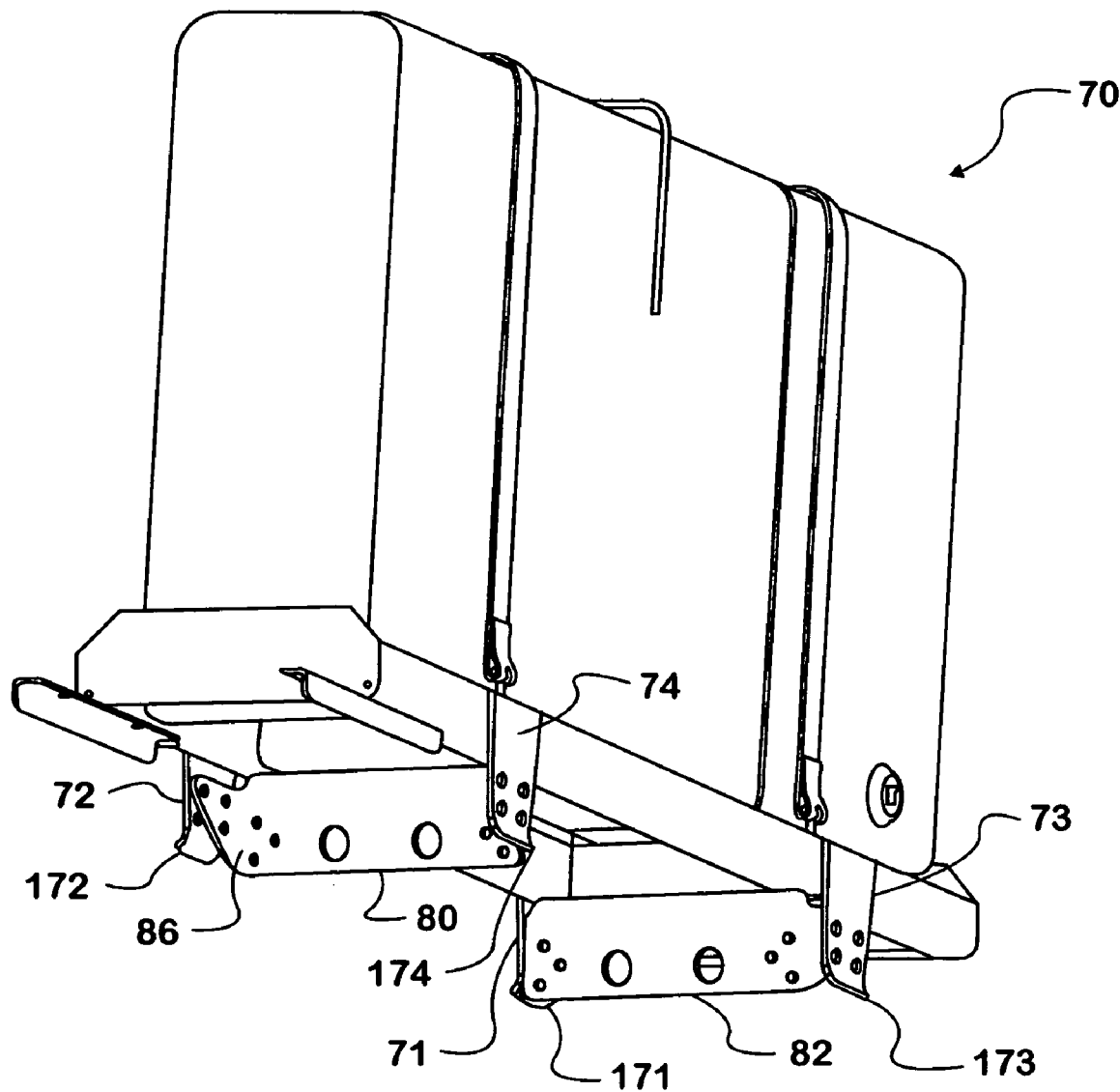
FIG. 7 is a perspective view of the modular fuel tank sub-assembly.

Referring to FIGS. 6 and 7, the operation of mounting tabs 71–74 cooperating with guide arms 86–89 to effect correct positioning of the fuel tank assembly from front to back along chassis 10 is illustrated. Frame rails 24 and 26 are deleted from the drawings for clarity of illustration. Each of mounting tabs 71–74 corresponds with one of guide arms 86–89. The correspondences are as follows: mounting tab 71 with guide arm 87; mounting tab 72 with guide arm 86; mounting tab 74 with guide arm 88; and mounting tab 73 with guide arm 89. When fuel tank assembly 70 is fully lowered onto frame rails 24 and 26, front to back pairs of mounting tabs snugly bracket to the outside front to back pairs of guide arms. A front to back pair of guide arms are the guide arms extending from a particular side rail bracket. Front to back pair of mounting tabs 71, 73 corresponds to the guide arms of side rail bracket 82 and front to back pair of mounting tabs 72, 74 corresponds to the guide arms of side rail bracket 80.

The lower edges of mounting tabs 71–74 turn outwardly from the corresponding guide arms for each mounting tab, thereby providing lower cam sections 171–174. When fuel tank module 70 is lowered onto rail side brackets 80 and 82, alignment need not be initially perfect. Any of cam sections 171–174 may impinge against its corresponding guide arm, resulting in the fuel tank module 70 being urged forward or backward into alignment on the guide arms, assuring alignment of the attachment points on the mounting tabs with attachment points on the guide arms. Alignment of mounting tabs 71–74 with guide arms 86–89 may be assured by fixing the side rail brackets 80 and 82 when attaching them to frame rails 24, 26.

Referring to FIG. 8, the completed assembly of fuel tank module 70 on frame rails 24 and 26 is illustrated. Fasteners 139 are installed to attach side rail brackets 80 and 82 to frame rails 24 and 26 and to attach mounting tabs 71 and 72 to side rail brackets 80 and 82. Fasteners 139 are typically nut and bolt combinations, with the bolts being oriented through the guide arms and mounting tabs so that nuts are attached to the relative outside of the assembly, i.e. from in front of and behind fuel tank module 70.

Installation of the fuel tank module 70 on frame rails 24 and 26 involves first installing side rail brackets 80, 82 on the frame rails. The sub-assembly of the fuel tank module 70 is then lowered onto the frame rails, oriented with the mounting tabs 71–74 downwardly oriented and approximately over their corresponding guide arms. Assuming fuel tank module 70 is not perfectly aligned, as fuel tank module 70 is lowered one or more of the mounting tabs encounters either one of the guide arms 86–89 along a cam section or one of the frame rails 24, 26 against an alignment edge. Contact urges fuel tank module 70 either to the left or right and either forward or backward to fix the fuel tank module's position. As fuel tank module 70 becomes fully lowered, its carrier 44 comes to a rest on support edges 97 and 99, supporting the vertical position of the module. The invention allows assembly of the fuel tank module on the vehicle chassis with a minimum of direct labor input devoted to alignment.

While the invention is shown in only one of its forms, it is not thus limited but is susceptible to various changes and modifications without departing from the spirit and scope of the invention.

What is claimed is:

1. A method for mounting a module across a pair of frame rails of a motor vehicle chassis, the method comprising the steps of:

mounting a pair of side rail brackets longitudinally aligned on one another on outside faces of the frame rails, each of the side rail brackets having a horizontal back edge extending above a top face of its respective frame rail and two alignment arms extending outwardly from the frame rail and perpendicular thereto;

providing four mounting tabs on the module, each mounting tab extending downwardly from the module in a usual orientation of the module, the mounting tabs being disposed at the four corners of a rectangle with each mounting tab having a lead cam section and an alignment edge;

lowering the module onto the pair of frame rails in an orientation bringing each of the four mounting tabs into proximity to a different one of the alignment arms, with the alignment edges guiding side to side positioning of the module by interaction against the frame rails and the lead cam sections guiding positioning of the module fore to aft by contact with the alignment arms; and resting the module on the horizontal back edge of the side rail bracket to complete alignment of the alignment arms and the mounting tabs.

2. A method for mounting a module as set forth in claim 1, further comprising the step of:

attaching the mounting tabs and side rail brackets using conventional fastening means.

3. A method for mounting a module as set forth in claim 2, further comprising the steps of:

assembling the module prior to installation on the vehicle chassis from a carrier and a fuel tank.

* * * * *